US006147318A

United States Patent [19]

Marhic

[11] Patent Number: 6,147,318

[45] Date of Patent: Nov. 14, 2000

[54] ASSEMBLY OF ELECTRODE BODY AND ELECTRODE CARRIER FOR A PLASMA TORCH

[76] Inventor: Gérard Marhic, 7 Bocage Marine, 95000 Cergy Pontoise, France

[21] Appl. No.: 09/443,116

[22] Filed: Nov. 18, 1999

[51] Int. Cl.$^{7}$ .................................................... B23K 10/00

[52] U.S. Cl. ................................ 219/121.52; 219/121.5; 219/121.48; 219/75

[58] Field of Search ............................ 219/121.52, 121.5, 219/121.48, 121.51, 121.39, 74, 75; 313/231.31, 231.41

[56] References Cited

U.S. PATENT DOCUMENTS

| | | | |
|---|---|---|---|
| 4,059,743 | 11/1977 | Wsibian et al. . | |
| 4,250,373 | 2/1981 | Tanida . | |
| 5,097,111 | 3/1992 | Severance, Jr. .................... | 219/121.48 |
| 5,938,949 | 8/1999 | Enyedy et al. ....................... | 219/121.5 |

*Primary Examiner*—Mark Paschall

*Attorney, Agent, or Firm*—Young & Thompson

[57] ABSTRACT

Male/female assembly (11) for a plasma torch comprising an electrode body (3) and an electrode carrier (4), in which:

the electrode body (3) comprises at least one tapping (15) within which is provided at least one recess (8) extending over all the lengths (d) of said tapping (15), and at least one downstream portion defining a recess (16) located between the upstream tapped portion and the bottom of the electrode body (3), and the electrode carrier (4) comprises, on its external peripheral surface, at least one gauge (4") having at least locally a profile corresponding to the profile of said at least one recess (8) of the electrode body (3) and at least one screw thread (15'), said gauge (4") being located between the downstream end of the electrode carrier (4) and said screw thread (15).

10 Claims, 3 Drawing Sheets

Figure 7:
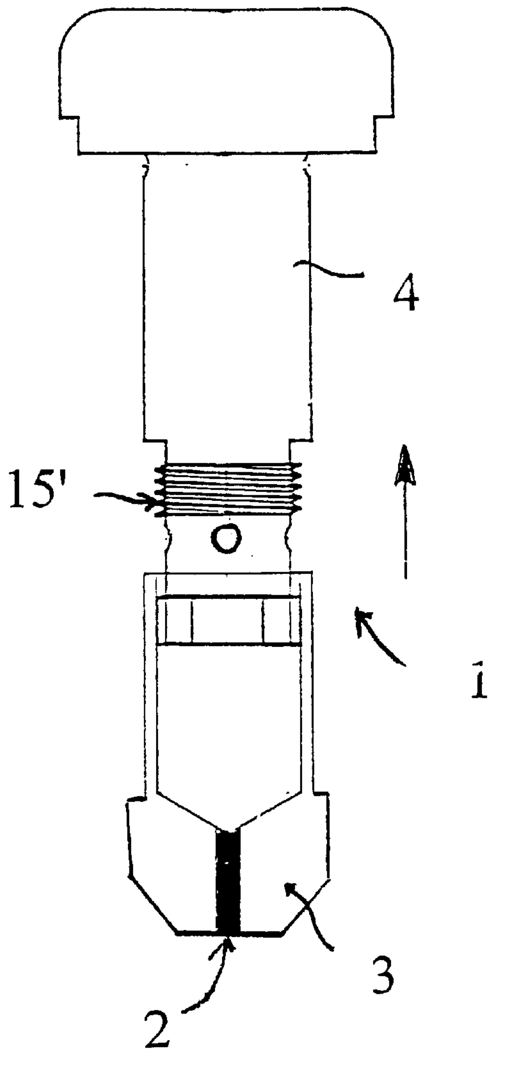

FIG. 1
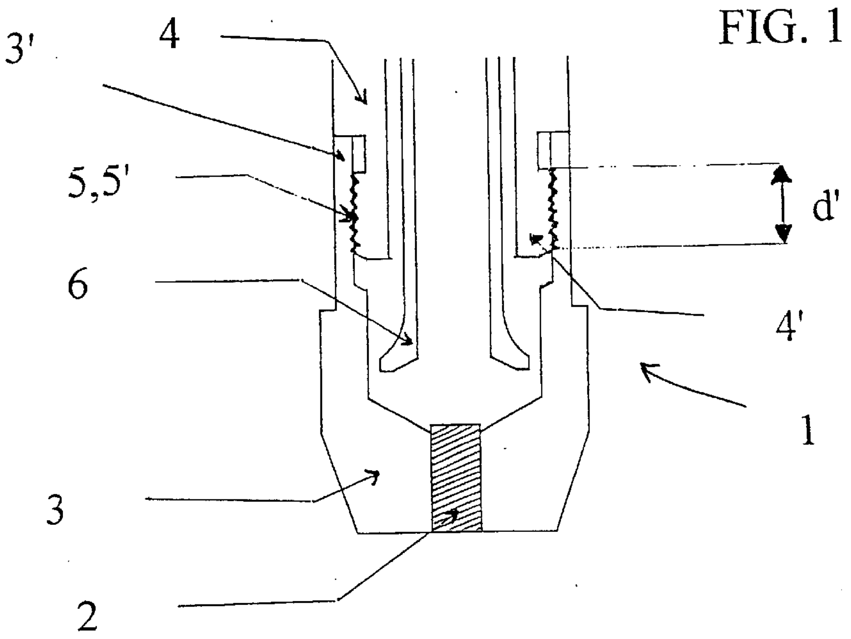
FIG. 2
FIG. 3
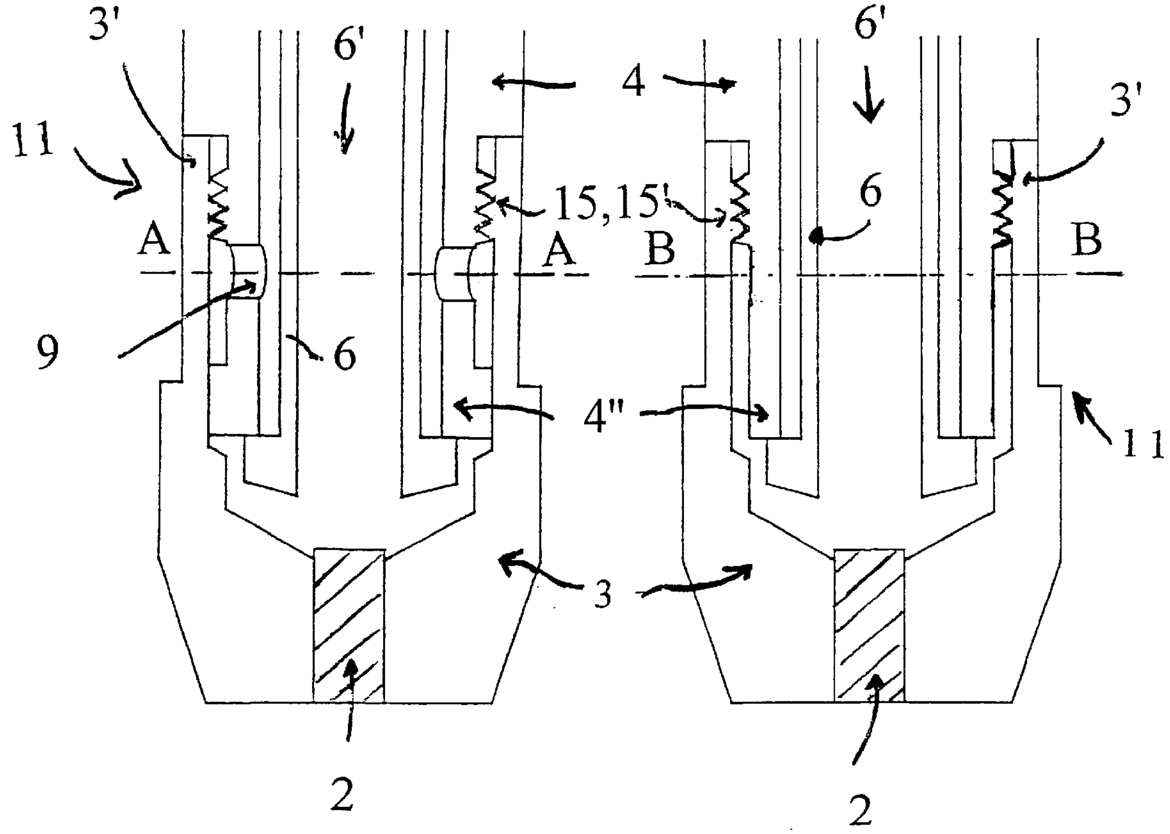

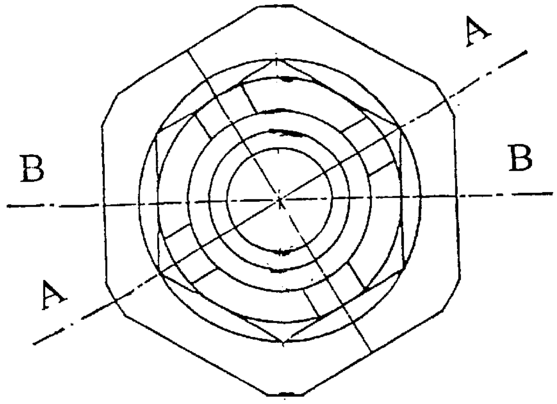
FIG. 3A
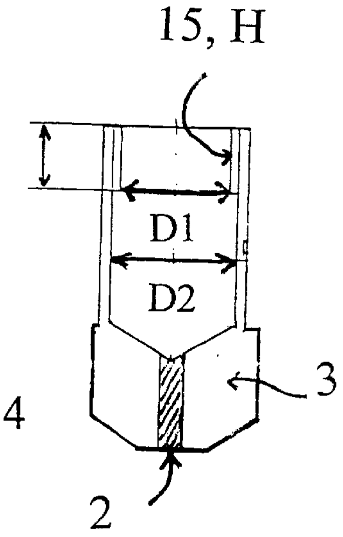
FIG. 4
FIG. 6
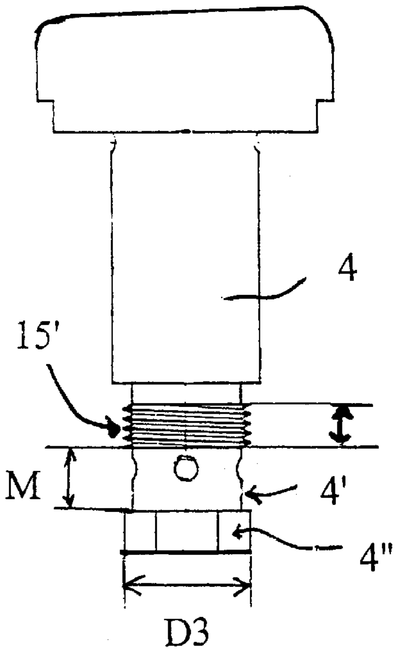
FIG. 5
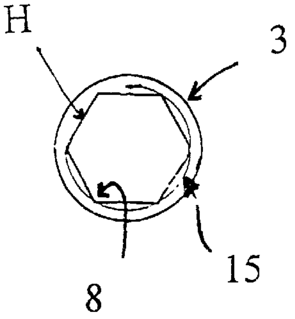
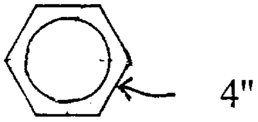
FIG. 6A

ASSEMBLY OF ELECTRODE BODY AND ELECTRODE CARRIER FOR A PLASMA TORCH

The present invention relates to an assembly of an electrode body/electrode carrier for a plasma torch, to a plasma torch provided with such an assembly, and to a process for welding, cutting or marking with the plasma arc, adapted to use such a torch.

Conventionally, plasma torches are comprised by a torch body with, in its rear portion, connections to fluid supply conduits, particularly of plasmagenic gas, an electric current, and in its front portion, means for mounting the electrode body and the nozzle.

In certain cases, so as particularly to facilitate maintenance and/or replacement of the worn or defective pieces, the torch can be provided with quick assembly/disassembly means, as described in the document EP-A-599709, which is incorporated herein by reference.

As set forth in detail hereafter, in conventional plasma torches, the electrode properly so called is generally carried by a support element, also called an electrode body, which performs moreover a radiator function by permitting the discharge of a portion of the heat given off during welding, cutting or plasma marking, by heat exchange with a cooling fluid.

Conventionally, the electrode body has the shape of a tapped sleeve of circular cross-section. The tapping provided on a portion of the internal peripheral surface of the sleeve permits ensuring securement by screwing of the electrode body onto the electrode carrier, which has a complementary screw thread on it external circumference.

However, it has been observed that with this type of mounting relying solely on securement by screwing, the centering of the electrode body is not always correctly ensured.

There accordingly results accelerated deterioration, particularly of the electrode properly so called and in particular of the nozzle, thereby giving rise to more frequent replacement of the assembly constituted by the electrode and the torch nozzle and correspondingly an increase of cost.

Moreover, if an increase in the length of the screw threading permits partially overcoming this problem of bad centering of the electrode, this solution cannot be considered as totally satisfactory because it involves a decrease of the internal surface permitting heat exchange between the cooling fluid and the electrode body and hence an important loss of cooling efficiency of this latter. In other words, the increase of the length of the securement screw threads takes place to the detriment of heat exchange, which is not acceptable.

The object of the present invention is therefore to overcome the mentioned problems by providing a male/female assembly for a plasma torch whose structure permits in particular improving the centering of the electrode body along the electrode carrier and this without requiring an increase of the length of the securement screw threads.

The present invention thus relates to a male/female assembly for a plasma torch comprising an electrode body having substantially the shape of a sleeve forming the female portion and an electrode carrier having a substantially elongated shape forming the male portion, in which:

- the electrode body comprises, on an upstream portion of its internal periphery, at least one tapping in which is provided at least one recess extending over all the length of the tapping, the tapped portion having, in transverse cross-section, a diameter D1, and at least one downstream portion defining a recess of diameter D2 located between the upstream tapped portion and the bottom of the electrode body, with D2>D1, and
- the electrode carrier comprises, on its external peripheral surface, at least one gauge having at least locally a transverse cross-sectional profile corresponding to the profile of said at least one recess of the electrode body and at least one screw thread, said gauge being located between the downstream end of the electrode carrier and said screw threading.

As the case may be, the male/female assembly according to the invention can comprise one or several of the following characteristics:

- the electrode body comprises several recesses;
- the recesses of said electrode body form, in transverse cross-section, a polygon;
- the recesses form a polygon selected from triangle, square, pentagon, hexagon, heptagon and octagon;
- the bottom of the electrode body, which is to say its active end, comprises moreover an electrode.

The invention also relates to an electrode body adapted to constitute the female portion of a male/female assembly according to the invention and an electrode carrier adapted to constitute the male portion of a male/female assembly according to the invention.

According to still another aspect, the invention relates to a plasma torch of an automatic machine or any similar mechanized device, comprising an electrode body and/or an electrode carrier, as mentioned above.

The invention moreover relates to a process for cutting, welding or marking with an arc plasma adapted to use a plasma torch according to the invention.

The present invention will now be described in greater detail with reference to the accompanying drawings, given by way of illustration but not limitation.

FIG. 1 shows a diagram of a longitudinal cross-section of a portion of the distal end of a male/female assembly for a plasma torch according to the prior art. This male/female assembly 1 is comprised by an electrode carrier 4 whose distal end 4' carries a screw thread 5' on a portion of its external peripheral wall, an electrode body 3 having a tapping 5 provided over a portion of its internal peripheral wall of its proximal end 3' and supporting moreover the electrode 2 properly so called.

The electrode body 3 has substantially the shape of a sleeve and is affixed solely by screwing onto the electrode carrier 4 by means of the screw thread 5' and the tapping 5 carried respectively by said distal end 4' and proximal end 3'.

In other words, the screw threaded portions 5' and tapped portions 5 ensure not only the centering and the positioning of the electrode body 3 on the electrode carrier 4, but also their maintenance in contact with each other.

Moreover, the downwardly extending tube 6 ensures the supply of a cooling fluid which will sweep the internal walls of the electrode body 3 and of the electrode carrier 4, so as to ensure cooling of these by heat exchange. Conventionally, the electrode body 3 is made of a metal or a metal alloy, for example a copper alloy.

The electrode 2 is an electrode for cutting, welding or marking with a plasma arc which may or may not, as the case may be, comprise a reinforcement or a protuberance at its downstream end, which can be made of a material selected particularly from hafnium, zirconium and tungsten.

The male/female assembly 1 shown in FIG. 1 has several drawbacks, particularly imperfect or incorrect centering of the electrode body 3 on the electrode carrier 4, given that said centering is ensured only by the screw threaded portions 5 and 5'.

However, if the electrode body 3 is incorrectly centered on the electrode carrier 4, there can result particularly accelerated deterioration of the electrode and/or of the nozzle.

FIGS. 2 to 8 show diagrams of an electrode carrier 3 or electrode body 4 according to the present invention, taken alone or in association with a male/female assembly.

It is to be noted that FIG. 3 shows a view in longitudinal cross-section of a male/female assembly identical to that of FIG. 2, but angularly offset by an angle of about 450, as shown in FIG. 3A.

More precisely, there is seen in FIGS. 2 and 3 a male/female assembly 11 according to the invention, comprising an electrode 2 carried by an electrode body 3, said electrode body 3 being secured by means of its proximal end 3', by screwing on the electrode carrier 4 by means of a screw threaded portion 15' and a tapped portion 15.

The tapping 15 is provided on the proximal portion of the internal wall of the electrode body 3 (see FIGS. 4 and 5) and the screw thread 15' is carried by a portion of the external peripheral wall of the electrode carrier 4 (see FIG. 6).

So as to overcome the above-mentioned problems and to ensure correct and efficacious centering of the electrode body 3, and hence of the electrode 2, on the electrode carrier 4, the interior of the electrode body 3 has been machined so as to have, in transverse cross-section, a hexagonal shape (H), adjacent its proximal end 3', as shown schematically in FIG. 5.

More precisely, recesses have been provided in the tapping 15 carried by the internal peripheral wall of the electrode body 3, so as to provide said hexagonal shape (H).

Moreover, a gauge 4" has been provided on the distal end 4' of the electrode carrier 4 (see FIG. 6) so as to be able to adapt it to the new internal configuration of the electrode body 3. More precisely, as can be seen in FIGS. 2, 3 and 4, the distal end 41 of the electrode carrier 4 has been prolonged in the direction of the electrode 2 and the gauge 4" located on its external wall has, in transverse cross-section, a shape at least locally complementary to that of the internal wall of the electrode body 3, that is to say, in this case, a shape which is also hexagonal, as shown schematically in FIG. 6A.

It should nevertheless be specified that the shape of the recesses and/or of the gauge 4" is not necessarily symmetrical, such as particularly convex or concave polygonal or polylobed shapes. Thus, the recesses 8 and the gauge 4" could have more or less complicated shapes, partially or completely complementary to each other, to the extent that the relative sliding by telescoping of the electrode carrier and the electrode body is ensured.

Moreover, a screw thread 15' has been provided on the external peripheral wall of said electrode carrier 4, so as to be able to coact, by screwing, with the tapping 15 carried by the electrode body 3.

Thanks to the configuration of the electrode body 3 and of the electrode carrier 4 according to the invention, one enjoys, during emplacement of the electrode body 3 on the electrode carrier 4, a substantially perfect centering of said electrode body 3 on said electrode carrier 4.

Figure 8:
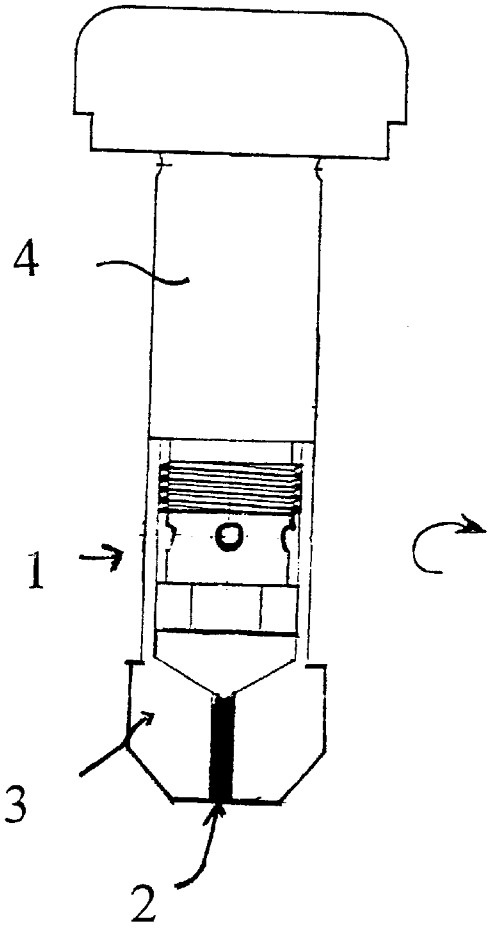

The emplacement of the electrode body 3 on the electrode carrier 4 is shown in detail in FIGS. 7 and 8.

This emplacement comprises a mounting phase (FIG. 7) and a gripping phase (FIG. 8). During the mounting phase (FIG. 7), the electrode carrier 4 is introduced within the sleeve which constitutes the electrode body 3, with a translatory movement up to the beginning of the screw thread 15, said screw thread 15 serving as an abutment. Then, during the gripping phase (FIG. 8), there is a screwing properly so called of the screw threaded portion 15' and the tapped/recessed portion 15 with each other.

Thus, the centering of the electrode body 3 on the electrode carrier 4 is obtained by guiding/positioning by the gauge 4" carried by the electrode carrier 4 with the internal peripheral wall of the recess 16, which is to say of the support portion of the electrode 3 having a diameter D2, as shown in FIG. 4.

In all cases, the diameter D1 of the tapped/machined portion 15 is less than the diameter D2 of the recess 16 located between said tapped portion 15 and the bottom of the electrode body 3 (see FIG. 4).

Moreover, as is clearly seen from FIGS. 2 and 3, the length d of the tapping 15 and of the screw thread 15' carried by the electrode body 3 and electrode carrier 4 of the male/female assembly 11 according to the invention is substantially less than the length d' of the screw threads 5 and 5' of said pieces of a male/female assembly according to the prior art (FIG. 1). However, the fact of being able to reduce the size d of the tapping 15 and of the screw tread 15' is preferable, because such a reduction of size permits, with a constant external geometry, improving the cooling particularly of the electrode body 3 and of the electrode 2 by permitting a gain of heat exchange surface, which can exceed 400 relative to the heat exchange surface of a torch according to the prior art (FIG. 1).

Thus, as shown particularly in FIGS. 2 and 3A, the openings 9, which are here four in number, have been provided within the end 4' of the electrode carrier 4, which openings 9 permit the passage of the flow of cooling fluid from the channel 6' of the downwardly extending tube 6. This cooling flow can thus come into contact with the internal wall of the electrode body 3 so as to ensure efficacious cooling of the latter and cooling which is better than that obtained conventionally.

FIG. 4 is a schematic showing in longitudinal cross-section, of an electrode body 3 analogous to that of FIGS. 2 and 3, shown not secured to an electrode carrier. In this FIG. 4, it will be seen that the electrode body 3 has a sleeve shape bearing at its distal end the electrode 2 and at its proximal end 3', about its internal peripheral wall, a tapping 15 of a length d, within which are provided recesses 8, so as to have a transverse hexagonal cross-section H.

This will be seen better in FIG. 5, which shows in transverse cross-sectional view the tapping 15 of FIG. 4, and from which it will be seen that the recesses 8 have been provided in the tapping 15, so as to impart to it a substantially hexagonal shape H.

FIG. 6 is a schematic view of an electrode carrier 4 according to the invention having on its end 4', a screw thread 15' adapted to coact by screwing with the tapping 15 of the electrode body 3 of FIG. 4 and, moreover, a gauge 4" having a shape complementary to the recesses 8 provided in the tapping 15 of the electrode body 3.

The dimension D3 of the gauge 4" of the electrode carrier 4 is less, by a value of functional play, than the diameter D2 of the recess 16 of the electrode body 3, to prevent relative movement of one piece relative to the other, but sufficiently near or close to ensure the desired centering effect, and hence to permit correct positioning of the electrode body 3 on said electrode carrier 4.

Moreover, one should take care that the distance M separating the gauge 4" from the beginning of the screw thread 15' of the electrode carrier 4 be greater than the length d of the tapping of the electrode body 3.

The male/female assembly 11 according to the invention can be used on manual or automatic plasma torches.

What is claimed is:

1. Male/female assembly (11) for a plasma torch comprising an electrode body (3) having substantially the shape of a sleeve forming the female portion and an electrode carrier (4) of substantially elongated shape forming the male portion, in which:

the electrode body (3) comprises, over an upstream portion of its internal periphery, at least one tapping (15) within which is provided at least one recess (8) extending over all the length (d) of said tapping (15), the tapped portion (15) having, in transverse cross-section, a diameter D1, and at least one downstream portion defining a recess (16) of a diameter D2 located between the tapped upstream portion (15) and the bottom of the electrode body (3), wherein D2>D1, and the electrode carrier (4) comprises, over its external peripheral surface, at least one gauge (4") having at least locally a transverse cross-sectional profile corresponding to the profile of said at least one recess (8) of the electrode body (3) and at least one screw thread (15'), said gauge (4") being located between the downstream end of the electrode carrier (4) and said screw thread (15').

2. Male/female assembly according to claim 1, characterized in that the electrode body (3) comprises several recesses (8).

3. Male/female assembly according to claim 1, characterized in that the recesses (8) of said electrode body (3) form, in transverse cross-section, a polygon.

4. Male/female assembly according to claim 3, characterized in that the recesses (8) form a polygon selected from a triangle, a square, a pentagon, a hexagon, a heptagon and an octagon.

5. Male/female assembly according to claims 1, characterized in that the bottom of the electrode body (3) moreover comprises an electrode (2).

6. Electrode body (3), characterized in that it is adapted to constitute the female portion of a male/female assembly (11) according to claim 1.

7. Electrode carrier (4), characterized in that it is adapted to constitute the male portion of a male/female assembly (11) according to claim 1.

8. A plasma torch, characterized in that it is provided with a male/female assembly (11) according to claim 1, with an electrode body (3) and/or an electrode carrier (4).

9. A process for welding, cutting or marking with a plasma arc, characterized in that it uses a plasma torch according to claim 8.

10. Automatic machine for welding, cutting or marking with a plasma arc, characterized in that it is provided With a male/female assembly (11) according to claim 1, with an electrode body (3) and/or with an electrode carrier according to claim 7.

* * * * *